Figure 1:
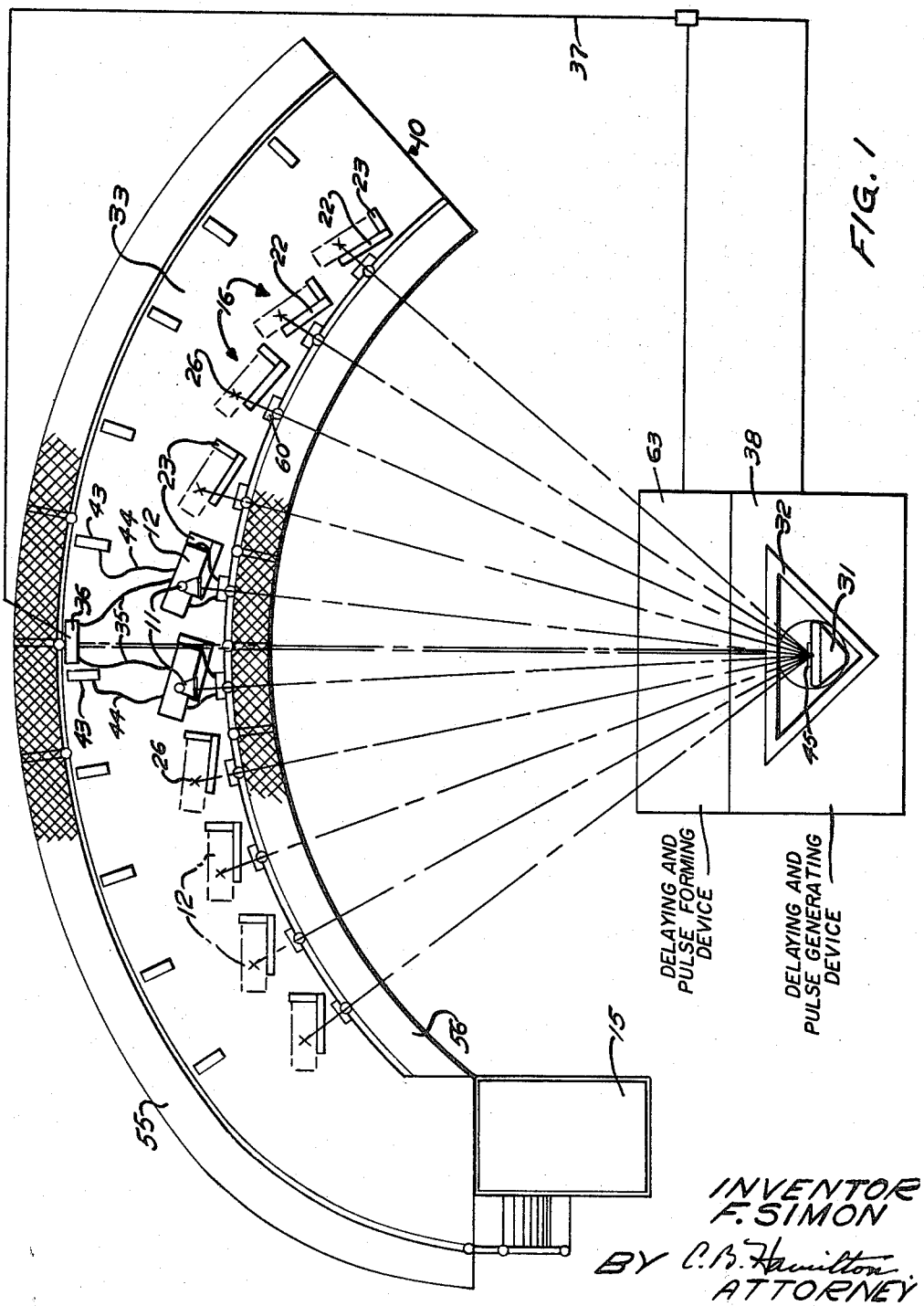

Nov. 22, 1960        F. SIMON        2,961,654
APPARATUS FOR CALIBRATING RADAR UNITS
Filed Oct. 29, 1954        2 Sheets-Sheet 1

INVENTOR
F. SIMON
BY C.B. Hamilton
ATTORNEY

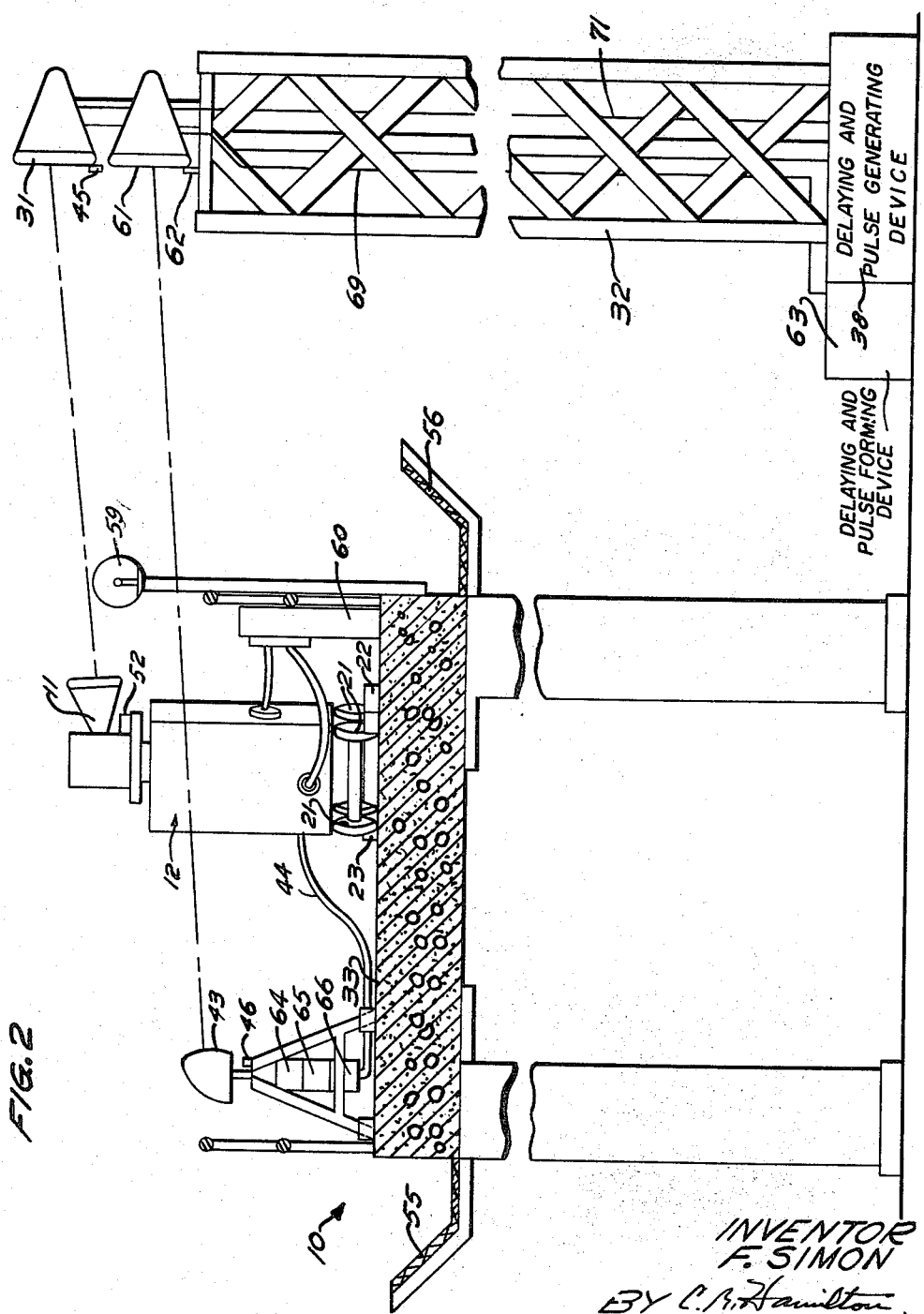

United States Patent Office 2,961,654
Patented Nov. 22, 1960

2,961,654

APPARATUS FOR CALIBRATING RADAR UNITS

Frank Simon, Riverside, Ill., assignor to Western Electric Company, Incorporated, New York, N.Y., a corporation of New York Filed Oct. 29, 1954, Ser. No. 465,576

1 Claim. (Cl. 343—17.7)

This invention relates to apparatus for calibrating radar units, and has for an object thereof the provision of new and improved apparatus for calibrating trailer-type radar units.

Another object of the invention is to provide apparatus for calibrating radar units without interference from ground echoes.

In apparatus illustrating certain features of the invention, a radar unit to be calibrated is elevated to a position sufficiently high off the ground level as to be substantially free of ground echoes, is trained on an elevated target a known distance away and is actuated to receive simultated echo pulses from the target. Synchronizing pulses from the unit are conducted over a path of known length to a transmitting antenna at the target so that the simulated echoes are transmitted from the target to the radar unit in known timed relationship with the generation of the synchronizing pulses to provide strong calibrating signals to the unit.

In an apparatus illustrating the invention more specifically, a series of radar unit trailers each having an acquisition system and a tracking system are located at predetermined points along an elevated arcuate platform, each trailer forming the same angle relative to a line from a radar tracking antenna thereon to a target tower having a target antenna thereon and positioned at the center of the arc of the platform. This angle is such that each of the trailers may be pulled out without disturbing any other trailer. Each radar unit then is connected to a coaxial cable of the same length leading to a selectively operable switching station having a coaxial cable leading to the target antenna on the tower. The switching station is actuated to selectively connect one of the first cables to the second cable, and the radar unit thus connected to the target antenna is actuated in a manner in which it sends synchronizing pulses through the cables to an oscillator which produces radar pulses which are conducted to the target antenna. The target antenna transmits the radar pulses conducted from the oscillator to the tracking antenna on the trailer unit under test, the transmitted pulses simulating return or echo pulses from a distant target. Acquisition units also may be mounted in suitable positions on the platform and connected selectively to the radar units, and an optical target may be provided below the tower target antenna to calibrate the acquisition and tracking antennae and the optical system of the radar unit.

A complete understanding of the invention may be obtained from the following detailed description of an apparatus forming specific embodiments thereof, when read in conjunction with the appended drawings, in which Fig. 1 is a top plan of an apparatus for practicing a method forming one embodiment of the invention, and Fig. 2 is a vertical section thereof.

Referring now in detail to the drawings, there is shown therein a level arcuate platform 10 elevated to a height at which is minimized interference from ground echoes to radar trailer units 12 having tracking receiver and transmitter antennae 11 and containing therein radar units of a well known type having pulse-generating devices and pulse-measuring devices. A type of radar system having acquisitons and tracking antennae that may be calibrated by an apparatus embodying the principles of the instant invention may be an Anti-Aircraft Fire Control System M-33 used by the United States Army. A more expicit description of the M-33 radar system is presented in U.S. Army Ordance Technical Manual 9-6092-1-1, entitled Anti-Aircraft Fire Control System M-33, which is available from the Publications Branch, Office of the Adjutant General, the Pentagon, Washington, D.C. Each trailer is brought to the platform by a hydraulic lift 15, is rolled along the platform to one of stations 16 thereon and is precisely located at that station by rolling wheels 21 of the trailer along and in touching engagement with a rail 22 fixed to the platform until the rear wheels of the trailer strike a stop rail 23 fixed to the platform. The tracking receiver and transmitter antenna 11 then is adjusted with the air of a plumb bob (not shown) depending below the trailer at the vertical axis of rotation of the antenna unit 11 to a position in which the vertical axis is directly over a mark 26 precisely located on the platform. In this position, the trailer extends longitudinally at a predetermined angle with respect to a line between the mark 26 and a wide angle target antenna 31 mounted on a tower 32 at a known elevation relative to the top surface of the platfor and a known distance from the mark 26. Each of the other stations 16 is provided with a side rail 22, a stop 23 and a mark 26. The marks 26 are all at the same distance from the target antenna, and, at each station, a rail 22 and stop 23 associated therewith locates the trailer thereat at the same angle relative to a line from the mark 26 at this station to the target antenna.

Each side rail 22 is a such an angle relative to the platform 10 and adjacent side rails that a trailer may be rolled therefrom to a clear portion 33 of the platform and along the portion 33 to the lift 15 without interfering with the trailers at the other stations. Obviously, one of the trailers also may be brought to and located at any station 16 without moving the trailers at the other stations.

All of the trailer units 12 at the stations 16 have synchronizing pulse generators connected by coaxial cables 35 of a same known length to a selective switching center 36. The switching center 36, which may comprise a plug and jack switchboard arrangement, connects any one of the cables 35 to another cable 37 of a predetermined length which is connected to a delaying and radar pulse generating device 38. The delaying and pulse generating device 38 receives synchronizing pulses from the radar unit 12 under test and creates radar pulses delayed a predetermined period of time relative to the synchronizing pulse in a well-known manner. The pulses from the delaying and generating device 38 are conducted to the target antennas 31. Upon operation of the system, the radar unit 12 under test generates synchronizing pulses which trigger the unit 12 as if the unit had sent a pulse from antenna 11, and key the delaying and pulse generating device 38 through the switching center 36 and cable 37. The delaying and pulse generating device 38 senses the time the unit 12 is triggered by means of the synchronizing pulse and produces a simulated echo pulse a predetermined time after the triggering of the unit 12 and this simulated pulse is transmitted by the target antenna 31. The antenna 31 directs the pulses through a wide horizontal angle including all of the trailers, about 80 degrees, and a narrow vertical angle of about 20 degress. The antenna 11 receives the pulses transmitted by the antenna 31 as simulated echoes which are stronger than true reflected echoes thereby providing a strong pulse for calibration.

The acquisition antenna 43 is a constantly rotating antenna which screens the entire 360-degree area around the radar system while the tracking antenna 11 selects a single target found by the antenna 43 to track the target. It may therefore be seen that the two antennas 11 and 43 are calibrated and coordinated together. The major portion of the radar circuitary for the acquisition antenna 43 is contained within the trailer 12, however, certain portions thereof, as a rotary drive 64, transmitter and receiver circuits 65, and a modulation circuit 66, are positioned with the antennas.

The delaying and pulse forming device 63, and the delaying and pulse generating device 38, are connected by cables 69 and 71, respectively, to target antennas 61 and 31 from which radar pulses are transmitted to the acquisition antenna 43 and the tracking antenna 11, respectively. Accordingly, a loop circuit is established from the acquisition radar 43 (triggered via cable 44 by synchronous pulses generated in trailer unit 12), cable 37, device 63, cable 69, target antenna 61, and thence to acquisition radar 43, and cable 44, back to the trailer unit 12. Also, a loop circuit is established from the tracking antenna 31 (triggered by synchronous pulses generated in trailer unit 12), cable 37, device 38, cable 71, target antenna 31, and thence to the tracking antenna 31, back to the trailer unit 12. Each acquisition antenna 43 is mounted on the platform in a marked oriented position thereon such that an azimuth optical system 46 thereof may be directed at a cross-hair target 62 below a second target antenna 61 directly below the target antenna 31. Synchronizing pulses from the trailer unit 12 triggers the unit as if pulses had been sent from antennae 43 and also actuate a delaying and radar-pulse forming oscillator 63, which has its radar pulses conducted to the target antenna 61 in the same manner as the delaying and pulse generating device 38 was operated through the switching center 36 to transmit pulses from antenna 31. The resulting pulses transmitted from the antenna 61 to the acquisition antenna 43 are at a different frequency than the pulses from the target antenna 31 so that the simulated echoes from the two target antennae are readily distinguished by the acquisition system and the tracking system.

When the tracking antenna 11 is directed precisely at the antenna 31, the antenna 11 receives the pulses from the antenna 31 in the greatest magnitude which is indicated by the tracking radar system of the trailer 12, and, since the angle of the trailer to the line between the antennae 11 and 31 is known, the antenna 11 may be calibrated relative to the trailer and the acquisition radar antenna 43 is calibrated relative to the tracking system. The known direction of the acquisition antenna 43 to the target antenna 61 is used to calibrate the acquisition system for direction and to insure that this direction is the same as is obtained from the calibration of the tracking antenna 11.

A cross-hair target 45 is mounted directly below the target antenna 31 the same distance that an optical or sighting system 52 of the radar unit 12 is mounted below the antenna 11. The optical system 52 is mounted for movement with the antenna 11 and must be adjusted or calibrated to be parallel to the pulses sent and received from the antenna 11. Hence, when the antenna 11 is trained on the target antenna 31, the optical system 52 is adjusted relative to the antenna 11 until it is trained on the cross-hair target 45 and is fixed in that position relative to the antenna 11. As the tracking antennae 11 and the acquisition antennae 43 operate together as a single radar system, the above-described apparatus allows adjustments of the system to insure that all components of the system to insure that all components of the ardar system are trained on a single target and in alignment with one another. Particularly, the apparatus insures that when the optical systems 52 and 46 are trained on a single target, the electrical systems responsive to the pulses received from antennaes 11 and 43 also show that the antennaes are on the same target.

Each trailer and acquisition antenna may be brought up to the platform, located precisely and connected to the switching center 36, all while the radar systems of another trailer are being precisely calibrated and without interfering with or being disrupted by other testing or locating operations on the other trailers. Also, the radar systems of the trailers at all the stations 16 are tested precisely alike with a minimum of equipment. The platform 10 is provided at each station 16 with an electrical outlet panel 60 for supplying power to the trailer units 12 and a lamp 59 to facilitate testing operations at night. Radiation guards 55 and 56 are provided to screen ground echoes or interference.

The synchronizing-pulse generators vary slightly in frequency one from another. Hence, by pulse frequency discrimination techniques, the radar systems of one trailer may be connected through the switching center to target antennae 31 and 61 and the radar systems of the other trailers may be operated simultaneously therewith without interference with one another.

In the use of the terms "echo" or "echoes" in the claims unless otherwise distinguished, it is intended to include simulated echoes as well as true reflected echoes.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

In an apparatus for supporting and positioning a plurality of mobile radar track antennas during calibration thereof with respect to a target antenna mounted on a tower, an arcuate platform centered on the target antenna, spaced columns for supporting the platform in an elevated horizontal plane, centering marks spaced along the platform equidistantly from the target antenna, wheel guides on the platform adjacent the marks for locating mobile radar track antennas at predetermined angles relative to lines from the target antennas to the marks, stops connected at right angles to the guides for locating the mobile track antennas directly over the marks, each wheel guide being at an angle with respect to the other such that the mobile antennas are located and removed at random from a wheel guide location without disturbance of the calibration operation of antennas at the other wheel guide locations, and continuous radiation shields extending horizontally from opposite arcuate edges of the platform to screen electrical ground interference from antennas positioned on the platform and to protect personnel against falling from the elevated platform.

References Cited in the file of this patent
UNITED STATES PATENTS

| | | |
|---|---|---|
| 1,909,537 | Hollingshead | May 16, 1933 |
| 2,477,485 | Jacob | July 26, 1949 |